United States Patent
Ichikawa

(10) Patent No.: US 11,292,358 B2
(45) Date of Patent: Apr. 5, 2022

(54) VEHICLE AND CONTROL METHOD FOR VEHICLE

(71) Applicant: Toyota Jidosha Kabushiki Kaisha, Toyota (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 16/543,809

(22) Filed: Aug. 19, 2019

(65) Prior Publication Data

US 2020/0122597 A1 Apr. 23, 2020

(30) Foreign Application Priority Data

Oct. 23, 2018 (JP) .............................. JP2018-199264

(51) Int. Cl.
| | |
|---|---|
| *B60L 53/62* | (2019.01) |
| *B60L 53/16* | (2019.01) |
| *H02J 7/00* | (2006.01) |
| *B60H 1/00* | (2006.01) |
| *B60L 50/60* | (2019.01) |
| *B60L 50/51* | (2019.01) |

(52) U.S. Cl.
CPC .......... *B60L 53/62* (2019.02); *B60H 1/00971* (2013.01); *B60L 53/16* (2019.02); *H02J 7/0047* (2013.01); *B60L 50/51* (2019.02); *B60L 50/60* (2019.02)

(58) Field of Classification Search
CPC .......... B60L 53/62; B60L 53/16; B60L 50/51; B60H 1/00971; H02J 7/0047
USPC ....................................................... 320/109
See application file for complete search history.

(56) References Cited

U.S. PATENT DOCUMENTS

| | | | | |
|---|---|---|---|---|
| 5,595,064 A | * | 1/1997 | Ikeda et al. ........... | B60L 3/0069 62/126 |
| 5,656,916 A | | 8/1997 | Hotta | |
| 8,183,821 B2 | * | 5/2012 | Sakurai ................. | H02J 7/0036 320/104 |
| 8,427,103 B2 | * | 4/2013 | Ohtomo ................. | B60L 53/11 320/109 |

(Continued)

FOREIGN PATENT DOCUMENTS

| | | |
|---|---|---|
| EP | 2581257 A2 | 4/2013 |
| EP | 3358703 A1 | 8/2018 |

(Continued)

OTHER PUBLICATIONS

Gjelaj, Marjan et al., "Optimal design of DC fast-charging stations for EVs in low voltage grids", 2017 IEEE Transportation Electrification Conference and Expo (ITEC), IEEE, Jun. 22, 2017, p. 684-689.

*Primary Examiner* — Sun J Lin
(74) *Attorney, Agent, or Firm* — Dinsmore & Shohl LLP

(57) ABSTRACT

A vehicle includes a power storage device, a charging device configured to be supplied with an electric power from a power supply unit external to the vehicle for charging the power storage device, and an electronic control unit configured to detect information on a maximum output power of the power supply unit. The electronic control unit is configured to execute a predetermined process associated with the charging the power storage device based on the maximum output power of the power supply unit which is indicated by the detected information.

6 Claims, 6 Drawing Sheets

(56) References Cited

U.S. PATENT DOCUMENTS

| | | | |
|---|---|---|---|
| 8,773,065 B2* | 7/2014 | Ang | B60L 1/003 |
| | | | 320/104 |
| 8,773,719 B2* | 7/2014 | Baba et al. | G03G 15/5016 |
| | | | 358/3.01 |
| 9,013,138 B2* | 4/2015 | Nomura | H02J 7/007192 |
| | | | 320/104 |
| 9,878,628 B2* | 1/2018 | Tsukamoto | B60L 53/305 |
| 9,969,290 B2* | 5/2018 | Tang et al. | B60L 58/10 |
| 10,166,882 B2* | 1/2019 | Yang et al. | B60L 53/14 |
| 10,875,418 B2* | 12/2020 | Ishida et al. | B60L 53/62 |
| 2011/0227534 A1 | 9/2011 | Mitsutani | |
| 2013/0088198 A1 | 4/2013 | Masuda | |
| 2016/0064959 A1 | 3/2016 | Jung et al. | |
| 2018/0091191 A1 | 3/2018 | Berger et al. | |
| 2020/0122594 A1* | 4/2020 | Ichikawa | B60L 53/22 |
| 2020/0373779 A1* | 11/2020 | Arizono | H01M 10/48 |

FOREIGN PATENT DOCUMENTS

| | | |
|---|---|---|
| JP | 2013-081324 A | 5/2013 |
| JP | 2015-109736 A | 6/2015 |
| WO | 2010/061465 A1 | 6/2010 |

\* cited by examiner

VEHICLE AND CONTROL METHOD FOR VEHICLE

CROSS-REFERENCE TO RELATED APPLICATIONS

This application claims priority to Japanese Patent Application No. 2018-199264 filed on Oct. 23, 2018, which is incorporated herein, by reference in its entirety including the specification, drawings and abstract.

BACKGROUND

1. Technical Field

The present disclosure relates to a vehicle and a control method for a vehicle and particularly to a vehicle including a power storage device and a charging device that can charge the power storage device and a control method for the vehicle.

2. Description of Related Art

A timer function not for fast charging but for AC normal charging is known (for example, see Japanese Unexamined Patent Application Publication No. 2013-81324 (JP 2013-81324 A)). In addition to an AC charging inlet, a DC charging inlet for fast charging of a vehicle including a power storage device and a charging device capable of charging the power storage device may be provided.

SUMMARY

DC charging has been used for only fast charging. Although it is predicted that vehicles including only a DC charging inlet will increase in the future, installation of a fast charging facility for DC charging in a home causes an increase in cost. Accordingly, a DC charging inlet is connected to an AC outlet in the home via a power converter and DC normal charging is executed. At this time, a user may feel unusual because a charging speed is low in spite of DC charging. Since a pre-charging operation based on the charging speed is necessary, convenience for a user deteriorates.

The present disclosure prevents deterioration in convenience for a user.

A first aspect of the present disclosure is a vehicle. The vehicle includes a power storage device, a charging device configured to be supplied with electric power from a power supply unit and to charge the power storage device, and an electronic control unit configured to detect information on a maximum output power of the power supply unit. The electronic control unit is configured to execute a predetermined, process associated with charging based on the maximum output power of the power supply unit which is indicated by the detected information.

With this configuration, a predetermined process associated with charging based on the maximum output power of the power supply unit is executed. As a result, it is possible to provide a vehicle that can suppress deterioration in convenience for a user due to the maximum output power of the power supply unit.

The vehicle may further include a notification unit. The electronic control unit may be configured to cause the notification unit to notify that fast charging of executing charging with a predetermined electric power or more is to be executed when the maximum output power of the power supply unit is equal to or greater than a predetermined value as the predetermined process. The electronic control unit may be configured to cause the notification unit to notify that normal charging of executing charging with the predetermined electric power or less is to be executed when the maximum output power of the power supply unit is less than the predetermined value as the predetermined process.

With this configuration, it is notified that fast charging is to be executed when the maximum output power of the power supply unit is equal to or greater than the predetermined value, and it is notified that normal charging is to be executed when the maximum output power of the power supply unit is less than the predetermined value. As a result, it is possible to restrain, a user from feeling unusual.

The vehicle may further include a charging inlet that is connected to a charging connector. The notification unit may be configured to display which of the fast charging and the normal charging is to be executed in time vicinity of the charging inlet.

With this configuration, which of fast charging and normal charging is to be executed is displayed in the vicinity of the charging inlet. As a result, it is possible to restrain a user from feeling unusual.

In the vehicle, the electronic control unit may be configured to prohibit timer charging when the maximum output power of the power supply unit is equal to or greater than a predetermined value as the predetermined process. The electronic control unit may be configured to permit the tinier charging when the maximum output power of the power supply unit is less than the predetermined value as the predetermined process.

With this configuration, timer charging is prohibited when the maximum output power of the power supply unit is equal to or greater than a predetermined value, and timer charging is permitted when the maximum output power of the power supply unit is less than the predetermined value. As a result, it is possible to suppress deterioration in convenience for a user.

In the vehicle, the electronic control unit may be configured to control the charging device such that the charging device charges the power storage device to a full state of charge when the maximum output power of the power supply unit is less than a predetermined value as the predetermined process. The electronic control unit may be configured to control the charging device such that the charging device charges the power storage device to a predetermined state of charge which is less than the full state of charge when the maximum output power of the power supply unit is equal to or greater than the predetermined value as the predetermined process.

With this configuration, the power storage device is charged to a full state of charge (SOC) when the maximum output power of the power supply unit is less than a predetermined value, and the power storage device is charged to a predetermined SOC which is less than the full SOC when the maximum output power of the power supply unit is equal to or greater than the predetermined value. As a result, it is possible to suppress deterioration in convenience for a user and to contribute to extension of a lifespan of the power storage device.

In the vehicle, the electronic control unit may be configured to prohibit pre-air-conditioning when the maximum output power of the power supply unit is equal to or greater than a predetermined value as the predetermined process. The electronic control unit may be configured to execute a process of permitting pre-air-conditioning when the maximum output power of the power supply unit is less than the predetermined value as the predetermined process.

With this configuration, pre-air-conditioning is prohibited when the maximum output power of the power supply unit is equal to or greater than a predetermined value, and pre-air-conditioning is permitted when the maximum output power of the power supply unit is less than the predetermined value. As a result, it is possible to suppress deterioration in convenience for a user.

With the present disclosure, it is possible to provide a vehicle that can suppress deterioration in convenience for a user.

A second aspect of the present disclosure is a control method for a vehicle. The vehicle includes a power storage device, a charging device configured to be supplied with electric power from a power supply unit and to charge the power storage device, and an electronic control unit configured to detect information on a maximum output power of the power supply unit. The control method includes executing, the electronic control unit, a predetermined process associated with charging based on the maximum output power of the power supply unit which is indicated by the detected information.

With this configuration, a predetermined process associated with charging based on the maximum output power of the power supply unit is executed. As a result, it is possible to provide a vehicle that can prevent deterioration in convenience for a user due to the maximum output power of the power supply unit.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
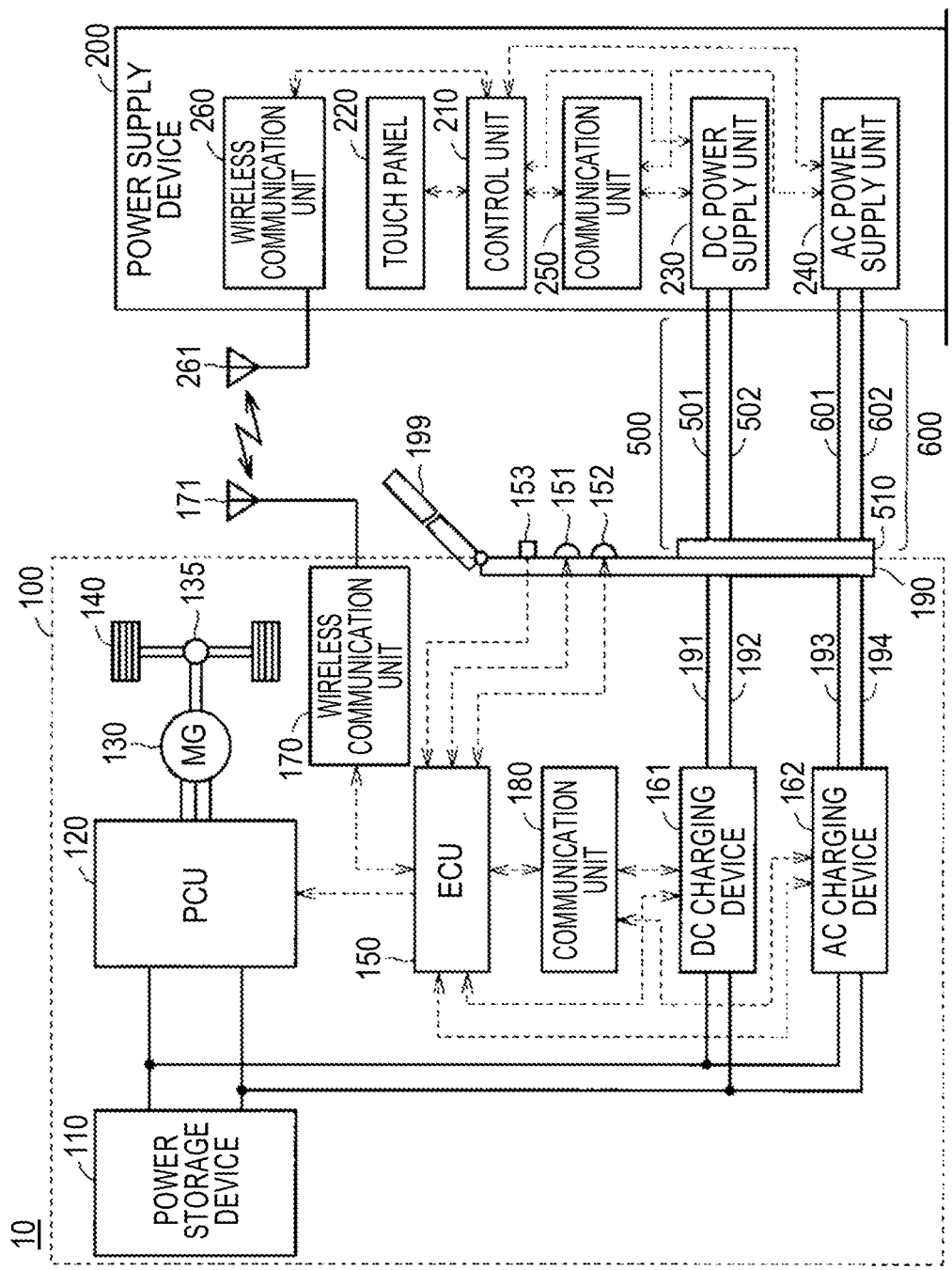
FIG. 1 is a first diagram schematically illustrating the entire configuration of a charging system according to an embodiment.

Hereinafter, embodiments of the present disclosure will be described in detail with reference to the accompanying drawings. The same or corresponding elements in the drawings will be referred to by the same reference signs and description thereof will not be repeated.

FIG. 1 is a first diagram schematically illustrating the entire configuration of a charging system 10 according to an embodiment. Referring to FIG. 1, the charging system 10 includes a vehicle 100 and a power supply device 200. The power supply device 200 is installed in a place in which the vehicle 100 can be parked and charged.

The vehicle 100 is a motor-driven vehicle and can be subjected to charging (AC charging and DC charging) by connection to the power supply device 200. AC charging is charging with alternating-current power. DC charging is charging with direct-current power. In this embodiment, it is assumed that the vehicle 100 supports the Combined Charging System (CCS, which is also referred to as "combo") standard. Note that the vehicle 100 has only to support a standard of charging supporting both AC charging and DC charging and may support, for example, standards of Mennekes Elektrotechnik GmbH & Co. KG (Type 2 (AC), Type 2 DC-mid).

The power supply device 200 can support both AC charging and DC charging. The power supply device 200 may support one of AC charging and DC charging.

The vehicle 100 includes a power storage device 110, a power control unit (PCU) 120, a motor generator 130, a power transmission gear 135, driving wheels 140, an electronic control unit (ECU) 150, a DC charging device 161, an AC charging device 162, a wireless communication unit 170, a communication unit 180, and a charging inlet 190.

The power storage device 110 is configured to be chargeable and dischargeable. The power storage device 110 includes, for example, a secondary battery such as a lithium-ion battery or a nickel-hydride battery. The power storage device 110 may be a battery using a liquid material as an electrolyte or may be a battery using a solid material as an electrolyte (a so-called all-solid battery). The power storage device 110 may include a power storage element such as an electric double-layer capacitor. The power storage device 110 supplies electric power for generating a driving force of the vehicle 100 to the PCU 120. The power storage device 110 stores electric power which is generated by the motor generator 130.

The PCU 120 is connected to the power storage device 110 via a power line. The PCU 120 is controlled in accordance with a control signal from the ECU 150 and converts direct-current (DC) power from the power storage device 110 into alternating-current (AC) power for driving the motor generator 130 or converts AC regenerative power from the motor generator 130 into DC power for charging the power storage device 110.

The motor generator 130 is an AC rotary electric machine and is, for example, a permanent magnet type synchronous electric motor including a rotor in which permanent magnets are embedded. The motor generator 130 is connected to the PCU 120 via a power line. The rotor of the motor generator 130 is mechanically connected to the driving wheels 140 via the power transmission gear 135. The motor generator 130 can generate electric power using a rotational force of the driving wheels 140 while a regenerative braking operation of the vehicle 100 is executed.

The ECU 150 includes a central processing unit (CPU), a memory, and an input/output buffer, none of which is illustrated, and executes various types of control in the vehicle 100. Such control is not limited to processing based on software and may be executed by constructing dedicated hardware (an electronic circuit).

The DC charging device 161 is connected to the power storage device 110 and the PCU 120 via power lines. The DC charging device 161 is controlled in accordance with a control signal from the ECU 150, converts a voltage of DC power from the power supply device 200 into a voltage of the power storage device 110, and charges the power storage device 110.

The AC charging device 162 is connected to the power storage device 110 and the PCU 120 via power lines. The AC charging device 162 is controlled in accordance with a control signal from the ECU 150, converts AC power from the power supply device 200 into DC power, converts the voltage thereof into a voltage of the power storage device 110, and charges the power storage device 110.

The wireless communication unit 170 is controlled by the ECU 150 and executes wireless communication with the power supply device 200 via an antenna 171. The wireless communication unit 170 is constituted by, for example, a digital communication module (DCM).

The communication unit 180 is controlled by the ECU 150 and executes power line communication (PLC) with the power supply device 200 via one of power lines 191 to 194. The communication mode of the communication unit 180 is not limited to PLC and may be a mode of communication based on a controller area network (CAN) communication protocol (hereinafter also referred to as "CAN communication").

The charging inlet 190 supports both an AC charging connector and a DC charging connector and has a shape conforming to the CCS standard in this embodiment. The charging inlet 190 is connected to the DC charging device 161 via the power lines 191, 192 and is connected to the AC charging device 162 via the power lines 193, 194.

Figure 4:
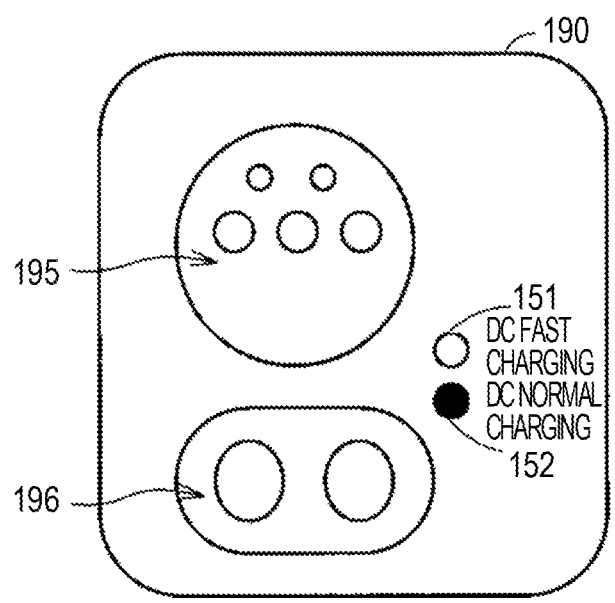
FIG. 4 is a diagram illustrating a notification mode in a charging inlet according to the first embodiment.

As illustrated in FIG. 4, which will be described later, or the like, a DC fast charging lamp 151 and a DC normal charging lamp 152 are provided in the charging inlet 190, and a charging lid 199 and an opening/closing sensor 153 that detects opening or closing of the charging lid 199 are also provided therein.

The charging lid 199 is a lid that shields the charging inlet 190. The charging lid 199 is opened to enable a charging connector 510 to be connected to the charging inlet 190 during charging, and is closed to prevent the charging connector 510 from being connected to the charging inlet 190 during non-charging.

The opening/closing sensor 153 transmits a detection signal indicating that the charging lid 199 is open to the ECU 150 in a state in which the charging lid 199 is open, and transmits a detection signal indicating that the charging lid 199 is closed to the ECU 150 in a state hi which the charging lid 199 is closed.

The DC fast charging lamp 151 is controlled in accordance with a control signal from the ECU 150 and is a lamp indicating that the vehicle 100 executes DC fast charging. The DC fast charging lamp 151 indicates that DC fast charging is executable or being executed when it is turned on, and indicates that DC fast charging is inexecutable or not being executed when it is turned off.

The DC normal charging lamp 152 is controlled in accordance with a control signal from the ECU 150 and is a lamp indicating that the vehicle 100 executes DC normal charging. The DC normal charging lamp 152 indicates that DC normal charging is executable or being executed when it is turned on, and indicates that DC normal charging is inexecutable or not being executed when it is turned off.

The power supply device 200 includes a control unit 210, a touch panel 220, a DC power supply unit 230, an AC power supply unit 240, a communication unit 258, a wireless communication unit 260, and a power cable. The power cable includes a DC power cable 500 and an AC power cable 600.

The DC power cable 500 includes power lines 501, 502. In a state in which the charging connector 510 is connected to the charging inlet 190, the power lines 501, 502 of the DC power cable 500 are connected to the power lines 191, 192 of the vehicle 100, respectively. Accordingly, the DC power supply unit 230 of the power supply device 200 and the DC charging device 161 of the vehicle 100 are electrically connected to each other and DC charging is possible.

The AC power cable 600 includes power lines 601, 602 and a signal line which is not illustrated. In a state in which the charging connector 510 is connected to the charging inlet 190, the power lines 601, 602 of the AC power cable 600 are connected to the power lines 193, 194 of the vehicle 100, respectively. Accordingly, the AC power supply unit 240 of the power supply device 200 and the AC charging device 162 of the vehicle 100 are electrically connected to each other and AC charging is possible.

The charging connector 510 is provided at ends of the DC power cable 500 and the AC power cable 600. The charging connector 510 can be connected to the charging 190. The shape of the charging connector 510 includes a part that is connected to an AC charging inlet portion 195 illustrated in FIG. 4 which will be described later and a part that is connected to a DC charging inlet portion 196 illustrated in the drawing. Accordingly, when the vehicle 100 supports both AC charging and DC charging, one selected from AC power and DC power can be supplied from the power supply device 200 via the charging connector 510.

When a power supply device supports only DC charging, the shape of a charging connector is the same as the shape of the charging connector 510, and the DC power cable 500 and the signal line included in the AC power cable 600 are connected to the charging connector.

When a power supply device supports only AC charging, the shape of a charging connector includes a part that is connected to the AC charging inlet portion 195 illustrated in FIG. 4 which will be described later and does not include a part that is connected to the DC charging inlet portion 196 illustrated in FIG. 4 and only the AC power cable 600 is connected to the charging connector.

The control unit. 210 includes a central processing unit (CPU), a memory, and an input/output buffer, none of which is illustrated, and executes various types of controls in the power supply device 200. These controls are not limited to processing based on software and may be executed by constructing dedicated hardware (an electronic circuit).

The touch panel 220 is controlled by the control unit 210, displays various types of information on a screen, and outputs a detection signal indicating what part of the screen a user has touched to the control unit 210.

The DC power supply unit 230 is controlled by the control unit 210 and supplies DC power to the vehicle 100 via the DC power cable 500 and the charging connector 510 while controlling a current value and a voltage value. The AC power supply unit 240 is controlled by the control unit 210 and supplies AC power to the vehicle 100 via the AC power cable 600 and the charging connector 510 while controlling a current value and a voltage value.

The communication unit 250 is controlled by the control unit 210 and executes power line communication with the vehicle 100 via one of the power lines 501, 502, 601, 602. Accordingly, the communication unit 250 of the power supply device 200 and the communication unit 180 of the vehicle 100 can communicate with each other.

The vehicle 100 and the power supply device 200 execute DC charging or AC charging while transmitting and receiving data to and from each other by communication. Data which is transmitted from the vehicle 100 to the power supply device 200 includes a charging start request, an upper-limit charging voltage value, and a command charging current value. Data which is transmitted from the power supply device 200 to the vehicle 100 includes maximum output information (such as a maximum output voltage value and a maximum output current value) and current output information (such as a current output voltage value and a current charging current value).

The wireless communication unit 260 is controlled by the control unit 210 and executes wireless communication with the vehicle 100 via an antenna 261. The wireless communication unit 260 is constituted by, for example, a digital communication module (DCM).

In FIG. 1, it is assumed that the power supply device 200 supports both DC charging and AC charging. However, the disclosure is not limited thereto and the power supply device 200 may support one of DC charging and AC charging. In this case, the vehicle 100 can support DC charging or AC charging, whichever is supported by the power supply device 200 as long as the charging standard of the vehicle 100 matches that of the power supply device 200.

Figure 2:
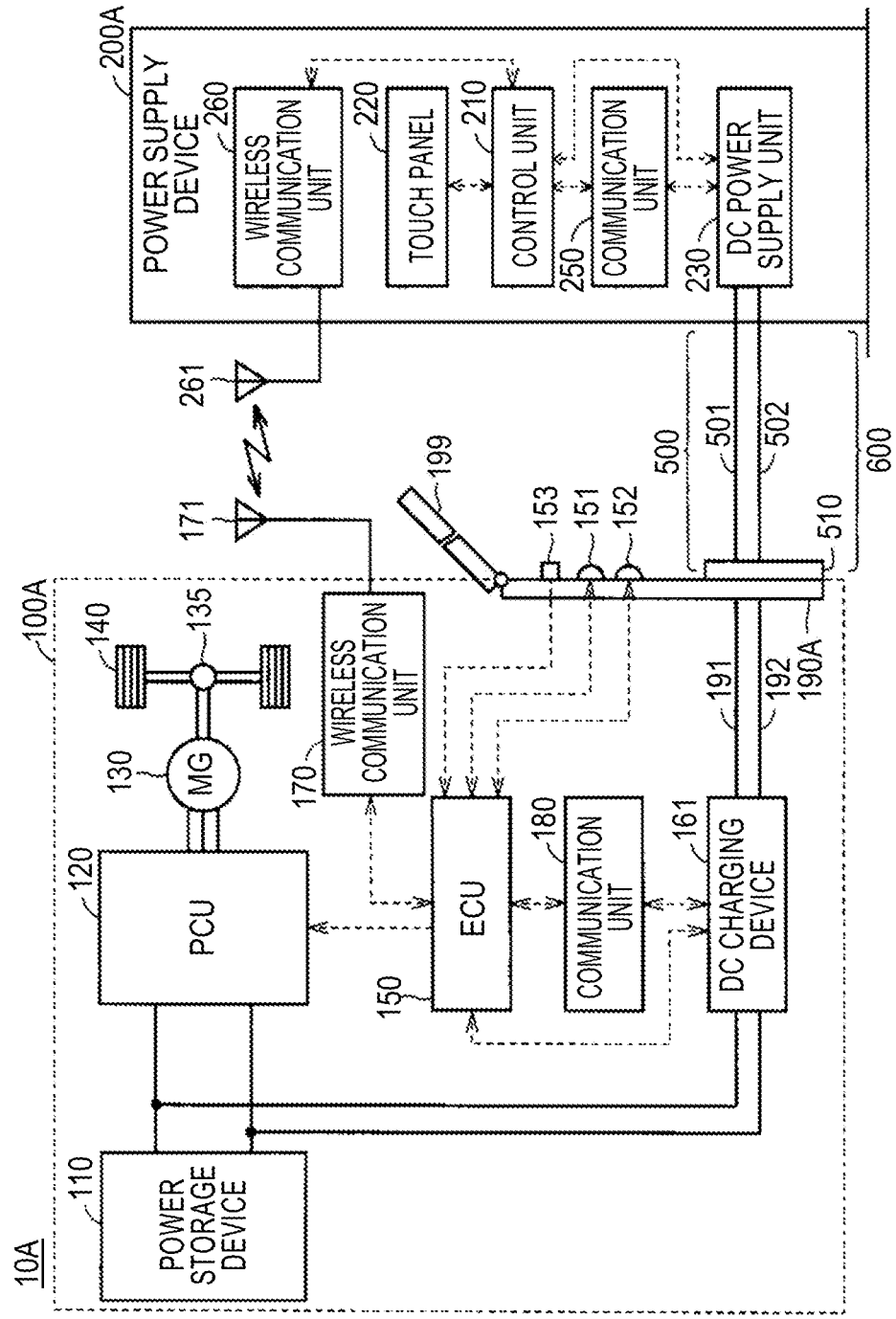
FIG. 2 is a second diagram schematically illustrating the entire configuration of a charging system according to an embodiment.

Recently, DC charging has been used for only fast charging. It is predicted that vehicles including a charging inlet which supports only DC charging will increase in the future. FIG. 2 is a second diagram schematically illustrating the entire configuration of a charging system 10A according to an embodiment. Referring to FIG. 2, a vehicle 100A illustrated in FIG. 2 has a configuration in which the AC charging device 162 and the power lines 193, 194 are excluded from the vehicle 100 illustrated in FIG. 1. A charging inlet 190A of the vehicle 100A is different from the charging inlet 190 of the vehicle 100 in that the power lines 193, 194 are not connected thereto. On the other hand, the charging inlet 190A has the same shape as the charging inlet 190 of the vehicle 100.

A power supply device 200A illustrated in FIG. 2 has a configuration in which the AC power supply unit 240 and the AC power cable 600 are excluded from the power supply device 200 illustrated in FIG. 1.

Here, normal charging is to charge a power storage device to a full state of charge (SOC 100%) for substantially several hours with a rated power output of several kW (for example, 3 kW) using a power supply with a single-phase AC of 200 V or 100 V. Fast charging is to charge a power storage device to a state of charge (for example, about SOC 80%) lower than the full SOC for a shorter time (substantially within one hour) than the normal charging with a rated power output of several tens of kW (for example, 50 kW) higher than that of normal charging using a power supply with a three-phase AC of 200 V, which supports a higher power output than normal charging.

However, installation of a fast charging facility for DC charging in a home causes an increase in cost. Accordingly, a charging inlet 190, 190A is connected to an AC outlet in the home via a power converter and DC normal charging is executed. The power converter is a device that converts an AC power into a DC power. At this time, a user may feel unusual because a charging speed is low in spite of DC charging. Since a pre-charging operation based on the charging speed is necessary, convenience for a user deteriorates.

Therefore, the vehicle 100, 100A according to this embodiment includes the power storage device 110 and the DC charging device 161 that can be supplied with electric power from a power supply unit (the power supply device 200, 200A or a combination of an AC outlet in a home and the power converter) and charge the power storage device 110. The ECU 150 detects information on a maximum output power of the power supply unit and executes, a predetermined process associated with charging based on the maximum output power of the power supply unit which is indicated by the detected information.

According to this configuration, a predetermined process associated with charging based on the maximum output power of the power supply unit is executed. As a result, it is possible to suppress deterioration in convenience for a user due to the maximum output power of the power supply unit.

Figure 3:
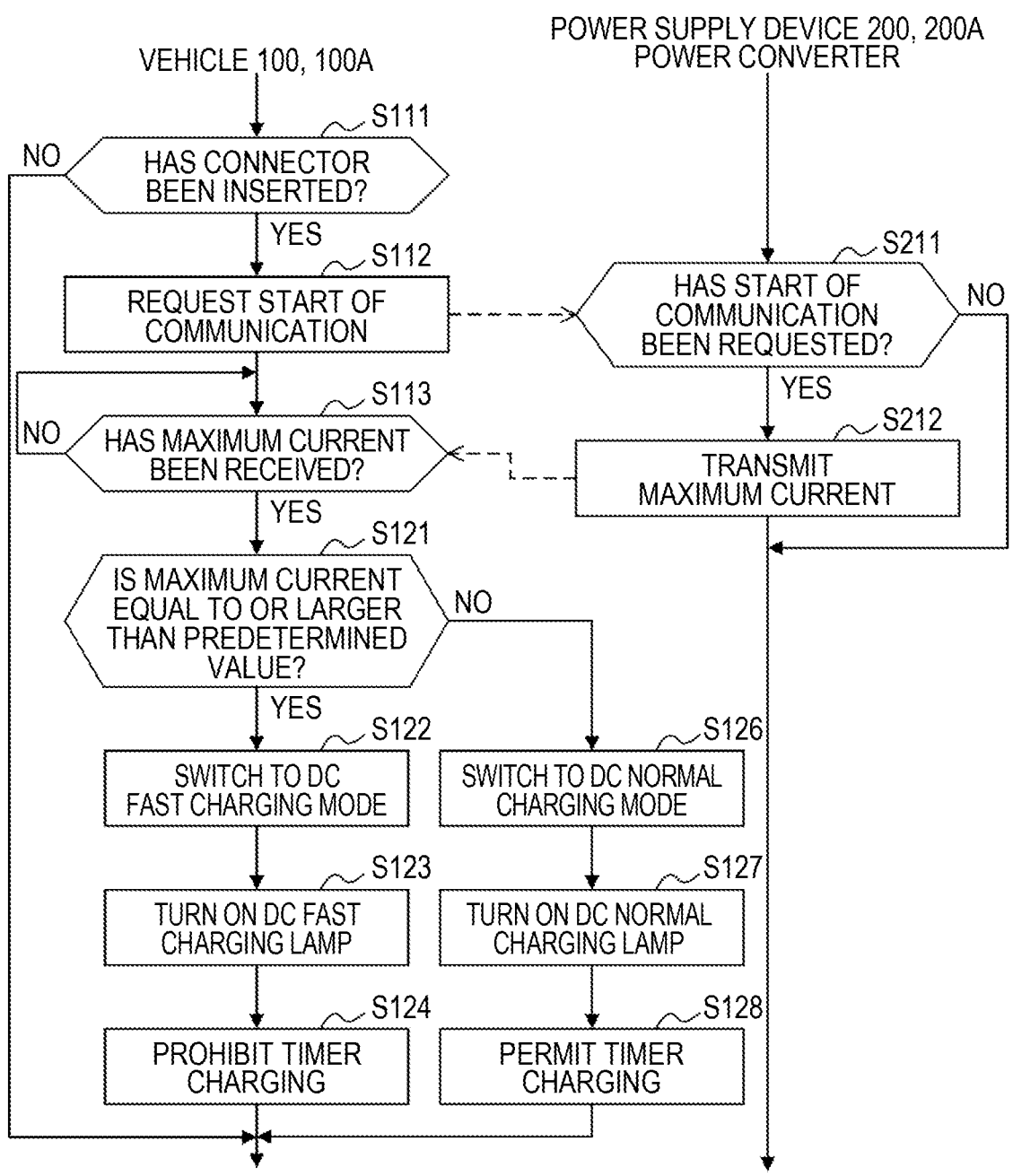
FIG. 3 is a flowchart illustrating processes executed in a first embodiment.

FIG. 3 is a flowchart illustrating processes executed in a first embodiment. The processes are periodically called and executed by a main routine which is executed by the ECU 150 of the vehicle 100, 1000. The same processes as illustrated in FIG. 3 are executed in any of the vehicles 100, 100A. Referring to FIG. 3, the ECU 150 of the vehicle 100, 100A determines whether the charging connector 510 supporting DC charging has been inserted into the charging inlet 190, 190A (Step S111). The charging connector 510 is also provided in the power converter similarly to the power supply device 200, 200A. Determination of whether the charging connector 510 supporting DC charging has been inserted is executed by determining whether a signal line state change (for example, a change from a state in which no current flows to a state in which a current flows) for detecting connection of the DC power cable 500.

Determination of whether the charging connector 510 supporting DC charging has been inserted is not limited thereto and can be executed, for example, by determining whether the ECU 150 of the vehicle 100, 100A can communicate with the power supply device 200 or 200A by power line communication based on the protocol of the CCS standard and whether a signal indicating that DC charging is supported has been received.

Although not illustrated, a process for AC charging is executed when a charging connector supporting AC charging has been connected to the charging inlet 190, 190A.

When it is determined that the charging connector 510 supporting DC charging has been inserted (YES in Step S111), the ECU 150 transmits a request signal for starting communication to the power supply device 200, 200A (Step S112).

The control unit 210 of the power supply device 200, 200A determines whether a request signal for starting communication has been received from the vehicle 100, 100A (Step S211). When it is determined that the request signal has been received (YES in Step S211), the control unit 210 transmits information including a maximum current of DC power which can be output from the power supply device 200, 200A to the vehicle 100, 100A (Step S212). The information to be transmitted has only to include information on the maximum output power of the power supply device 200, 200A, and may include the maximum power which can be output from the power supply device 200, 200A instead of the maximum current.

In the vehicle 100, 100A, it is determined whether information including the maximum current has been received from the power supply device 200, 200A (Step S113). When it is determined that information including the maximum current has not been received (NO in Step S113), the control unit 210 repeatedly executes the process of Step S113. Here executed it is described for the purpose of convenience that other processes than the process of Step 113 are not executed when the process of Step S113 is being repeatedly executed, but other processes can be actually executed.

When it is determined that information including the maximum current has been received (YES in Step S113), the ECU 150 determines whether the maximum current included in the received information is equal to or greater than a predetermined value (Step S121). The predetermined value has only to be a value (for example, a value corresponding to 10 kW) between fast charging and normal charging. When the maximum power is received instead of the maximum current, it is determined in Step S121 whether the maximum power is equal to or greater than a predetermined power. The predetermined power has only to be a value (for example, 10 kW) between fast charging and normal charging.

When it is determined that the maximum current is equal to or greater than the predetermined value (YES in Step S121), the ECU 150 switches a charging mode to a DC fast charging mode (Step S122). In the DC fast charging mode, when a user executes an operation of starting charging, DC fast charging is started.

Then, the ECU 150 turns on die DC fast charging lamp 151 and turns off the DC normal charging lamp 152 (Step S123). Here, the DC fast charging lamp 151 is turned on in the DC fast charging mode, but the disclosure is not limited thereto and the DC fast charging lamp 151 may be turned on during execution of DC fast charging.

Subsequently, the ECU 150 prohibits use of a timer charging function (Step S124). The timer charging function is a function of receiving a start time or an end time of charging from a user and starting charging from the received start time or completing charging until the received end time. Accordingly, a user cannot execute charging using the timer charging function.

Specifically, a flag indicating prohibition or permission is stored in the memory of the ECU 150 depending on whether use of the timer charging function is to be prohibited or permitted. When the flag indicating prohibition is stored, a start time or an end time of the timer charging function cannot be set and the timer charging function cannot be executed. When the flag indicating permission is stored, the start time or the end time of the timer charging function can be set and the timer charging function can be executed.

When it is determined that the maximum current is less than the predetermined value (NO in Step S121), the ECU 150 switches the charging mode to a DC normal charging mode (Step S126), in the DC normal charging mode, when a user executes an operation of starting charging, DC normal charging is started.

Then, the ECU 150 turns on the DC normal charging lamp 152 and turns off the DC fast charging lamp 151 (Step S127). Here, the DC normal charging lamp 152 is turned on in the DC normal charging mode, but the disclosure is not limited thereto and the DC normal charging lamp 152 may be turned on during execution of DC normal charging.

Subsequently, the ECU 150 permits use of the timer charging function (Step S128). Accordingly, a user can execute charging using the timer charging function.

FIG. 4 is a diagram illustrating a notification mode in the charging inlet 190, 190A according to the first embodiment. Referring to FIG. 4, the charging inlet 190, 190A includes an AC charging inlet portion 195, a DC charging inlet portion 196, a DC fast charging lamp 151, and a DC normal charging lamp 152. The DC fast charging lamp 151 and the DC normal charging lamp 152 may not be particularly limited as long as they can notify a user whether DC fast charging is possible and whether DC normal charging is possible, and each thereof is constituted by, for example, one light emitting diode (LED) lamp.

When DC normal charging is possible, the DC normal charging lamp 152 is turned on and the DC fast charging lamp 151 is turned off as illustrated in FIG. 4. When DC fast charging is possible, the DC fast charging lamp 151 is turned on and the DC normal charging lamp 152 is turned off.

When it is determined in Step S113 that the maximum current has not been received with the elapse of a predetermined time such as when the power converter does not support the same communication as communication between the vehicle 100, 100A and the power supply device 200, 200A, it may be determined that the maximum current is less than the predetermined value in Step S121.

In the first embodiment, it is switched whether timer charging is to be permitted depending on the maximum output power of the power supply device 200. In a second embodiment, a target state of charge (SOC: a charged state, a charged proportion) is switched depending on the maximum output power of the power supply device 200.

Figure 5:
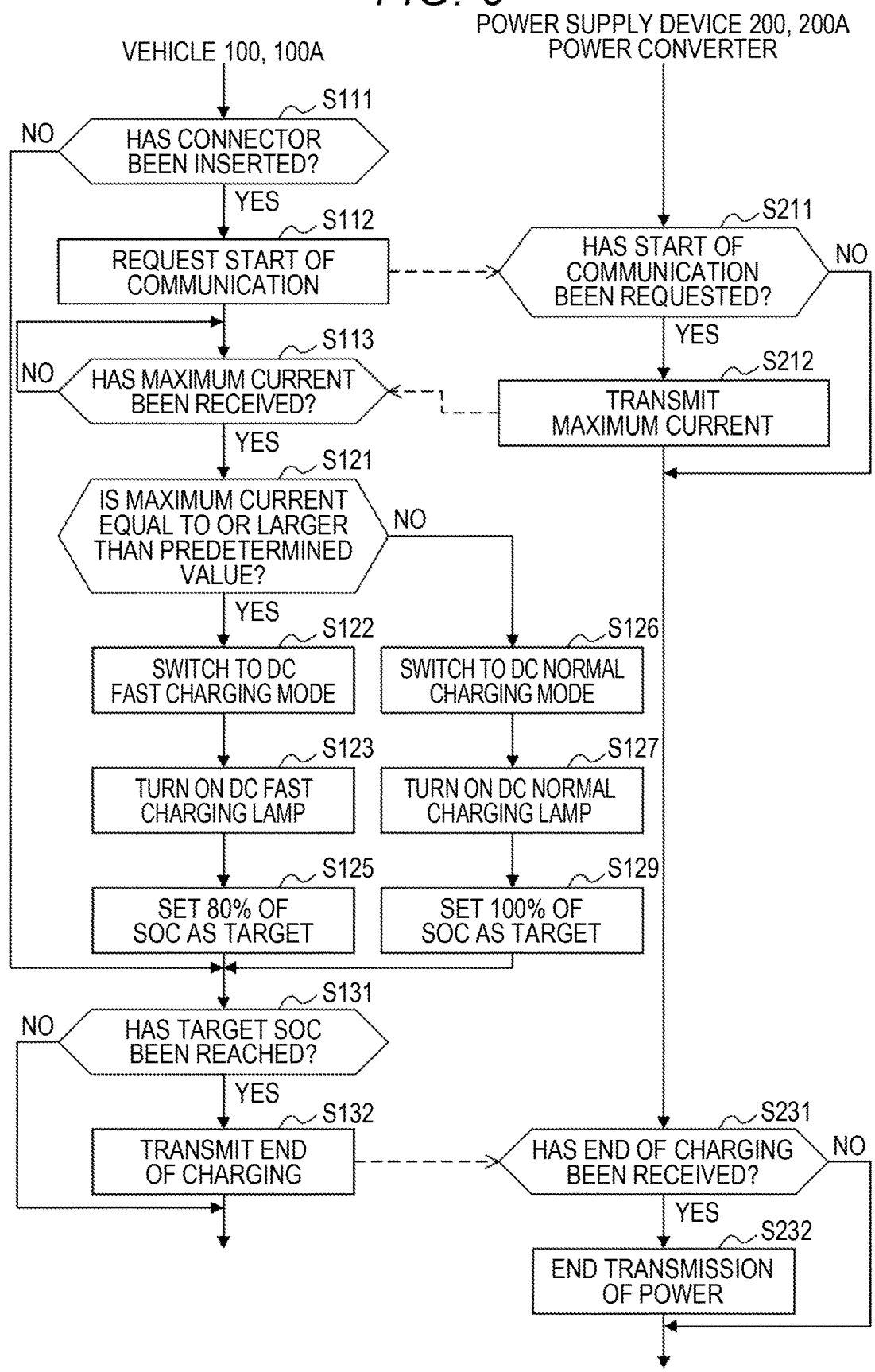
FIG. 5 is a flowchart illustrating processes executed in a second embodiment.

FIG. 5 is a flowchart illustrating processes executed in a second embodiment. The processes are periodically called and executed by a main routine which is executed by the ECU 150 of the vehicle 100, 100A. The same processes as illustrated in FIG. 5 are executed in any of the vehicles 100, 100A. Referring to FIG. 5, the processes of Steps S111 to S113, Steps S121 to S123, Steps S126 to S127, and Steps S211 to S212 are the same as illustrated in FIG. 3.

After Step S123, the ECU 150 sets SOC 80% as the target SOC (Step S125). Accordingly, when the maximum current of the power supply device 200, 200A is equal to or greater than the predetermined value and charging is started, the power storage device 110 is charged with SOC 80% as a target.

After Step S127, the ECU 150 sets SOC 100% as the target SOC (Step S129). Accordingly, when the maximum current of the power supply device 200, 200A is less than the predetermined value and charging is started, the power storage device 110 is charged with SOC 100% as a target.

After Steps S125 and S129, the ECU 150 determines whether the SOC of the power storage device 110 has reached the target SOC (Step S131). When it is determined that the SOC has reached the target SOC (YES in Step S131), the ECU 150 transmits a request signal for ending charging to the power supply device 200, 200A (Step S132).

In the power supply device 200, 200A, the control unit 210 determines whether a request signal for ending charging has been received from the vehicle 100, 100A (Step S231). When it is determined that a request signal for ending charging has been received (YES in Step S231), the control unit 210 controls the DC power supply unit 230 such that transmission of power to the vehicle 100, 100A is ended (Step S232).

In the first embodiment, whether timer charging is to be permitted is switched depending on the maximum output power of the power supply device 200. In a third embodiment, whether pre-air-conditioning is to be executed is switched depending on the maximum output power of the power supply device 200.

Figure 6:
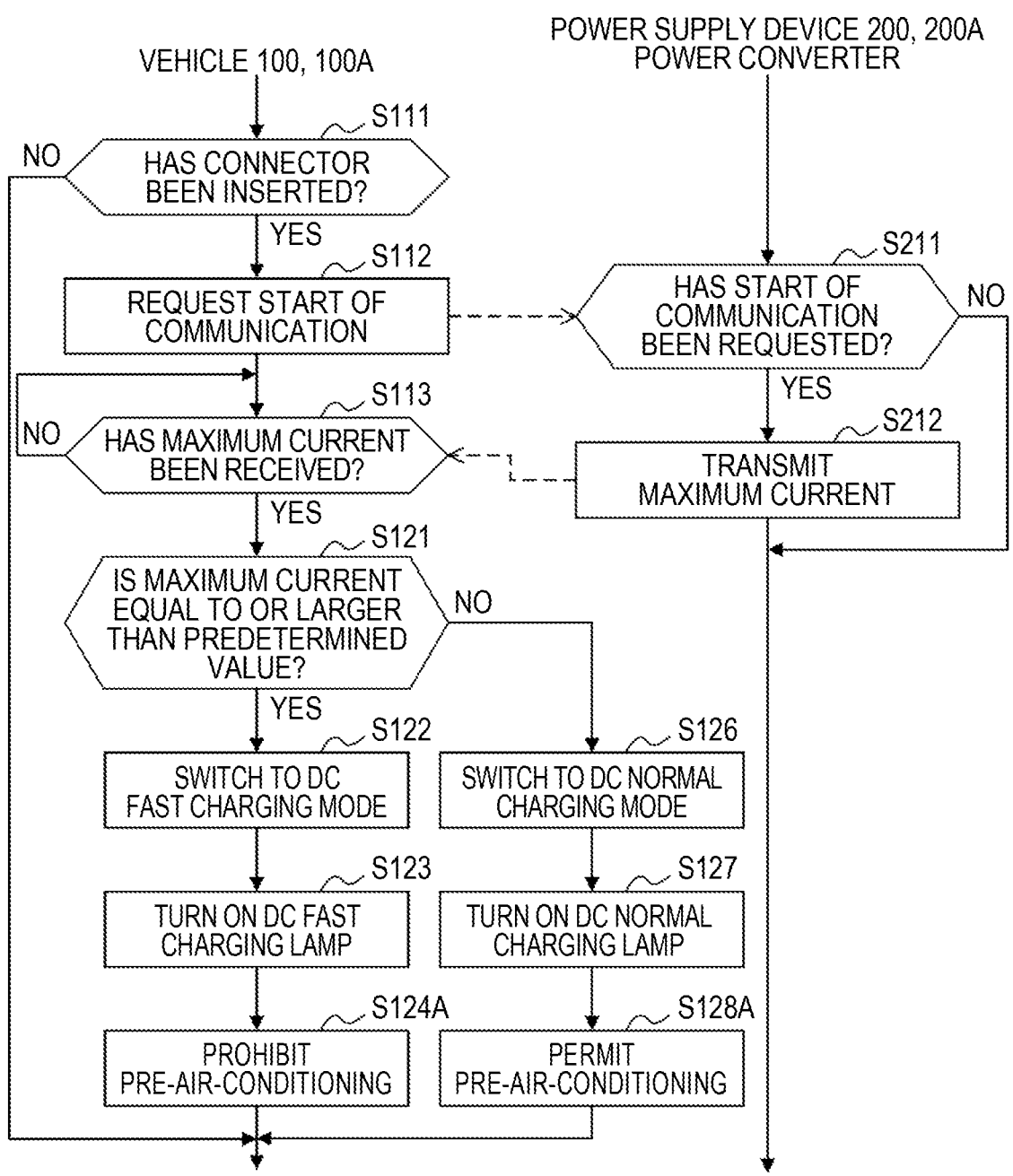
FIG. 6 is a flowchart illustrating processes executed in a third embodiment.

FIG. 6 is a flowchart illustrating processes executed in a third embodiment. In the processes, Step S124 and Step S128 of the processes in the first embodiment described above with reference to FIG. 3 are changed as follows.

Instead of Step S124, the ECU 150 prohibits use of a pre-air-conditioning function (Step S124A). The pre-air-conditioning function is a function of receiving an input of a scheduled start time from a user in a state in which the charging connector 510 is connected to the vehicle 100, 100A and causing an air conditioner to operate in a predetermined time (for example, 10 minutes) before the scheduled start time such that the interior temperature of the vehicle 100 reaches an appropriate temperature at the scheduled start time. The predetermined time is a time required until the interior temperature of the vehicle 100 reaches an appropriate temperature at the scheduled start time.

Instead of Step S128, the ECU 150 permits use of the pre-air-conditioning function (Step S128A). Accordingly, since use of the pre-air-conditioning function is automatically permitted in normal charging and a time longer than that in fast charging is required, the pre-air-conditioning function can be used to cause the interior temperature to reach an appropriate temperature at the input scheduled start time in normal charging in which a user is away from the vehicle 100 for several hours.

In the above-mentioned embodiments, the vehicle 100, 100A is a motor-driven vehicle not including an engine but including a motor generator. However, the disclosure is not limited thereto and the vehicle 100, 100A has only to be a vehicle including a charging inlet and capable of being charged. For example, the vehicle may be a plug-in hybrid vehicle including an engine and a motor generator.

In the above-mentioned embodiments, notification of DC fast charging or DC normal charging is executed using the DC fast charging lamp 151 and the DC normal charging lamp 152. However, the disclosure is not limited thereto and the notification may be executed using a mobile terminal such as a smartphone carried by a user, using a meter panel in a driver seat of the vehicle 100, 100A, or using a screen of a car navigation system of the vehicle 100, 100A. The disclosure is not limited to notification by display, and the notification may be executed by sound which is output from a speaker provided in the vicinity of the display unit.

In the above-mentioned embodiments, as illustrated in FIG. 3, the vehicle 100, 100A executes both of notification of DC fast charging or DC normal charging and permission/prohibition of timer charging. However, the disclosure is not limited thereto and only one of notification of DC fast charging or DC normal charging and permission/prohibition of timer charging may be executed. As illustrated in FIG. 5, both of notification of DC fast charging or DC normal charging and setting of the SOC are executed. However, the disclosure is not limited thereto and only one of notification of DC fast charging or DC normal charging and setting of the SOC may be executed. All of notification of DC fast charging or DC normal charging, permission/prohibition of timer charging, and setting of the SOC may be executed.

As illustrated in FIGS. 1 and 2, the vehicle 100, 100A includes the power storage device 110 and the charging device (the DC charging device 161 and the AC charging device 162) that can be supplied with electric power from a power supply unit (the power supply device 200, 200A or a combination of an AC outlet in a home and the power converter) and charge the power storage device 110. As illustrated in Step S113 in FIGS. 3 and 5, the ECU 150 detects information on the maximum output power of the power supply unit. As illustrated in Steps S122 to S129 in FIGS. 3 and 5, the ECU 150 executes a predetermined process associated with charging based on the maximum output power of the power supply unit which is indicated by the detected information.

Specifically, the information on the maximum output power of the power supply unit is information on the maximum current or the maximum power of the power supply unit. The predetermined process associated with charging based on the maximum output power of the power supply unit is a process which will be described below.

Accordingly, the predetermined process associated with charging based on the maximum output power of the power supply unit is executed. As a result, it is possible to suppress deterioration in convenience for a user due to the maximum output power of the power supply unit.

As illustrated in FIGS. 1 and 2, the vehicle 100, 100A farther includes the DC fast charging lamp 151 and the DC normal charging lamp 152. As illustrated in Steps S123 and S127 in FIGS. 3 and 5, the ECU 150 executes a process of notifying that fast charging is to be executed using the DC fast charging lamp 151 when the maximum output power of the power supply unit is equal to or greater than the predetermined value and notifying that normal charging is to be executed using the DC normal charging lamp 152 when the maximum output power is less than the predetermined value as the predetermined process.

Accordingly, it is notified that fast charging is to be executed when the maximum output power of the power supply unit is equal to or greater than the predetermined value and it is notified that normal charging is to be executed when the maximum output power is less than the predetermined value. As a result, it is possible to restrain a user from feeling unusual.

As illustrated in FIGS. 1 and 2, the vehicle 100, 100A further includes the charging inlet 190 or 190A that is connected to the charging connector 510. The DC fast charging lamp 151 and the DC normal charging tamp 152 display which of fast charging and normal charging is to be executed in the vicinity of the charging inlet 190, 190A. The vicinity of the charging inlet 190, 190A may be a position which is inside the charging lid 199 and which is visible by a user when the charging lid 199 is open, or may be an area (for example, an area separated several centimeters from the charging lid 199) which is outside the charging lid 199 and which is visible by a user without moving a point of view from the charging lid 199 on the outer surf tee of the vehicle 100, 100A.

Accordingly, which of fast charging and normal charging is to be executed is displayed in the vicinity of the charging inlet 190, 190A. As a result, it is possible to restrain a user from feeling unusual.

As illustrated in Steps S124 and S128 in FIG. 3, the ECU 150 performs a process of prohibiting timer charging when the maximum output power of the power supply unit is equal to or greater than the predetermined value and permitting timer charging when the maximum output power is less than the predetermined value as the predetermined process.

Accordingly, timer charging is prohibited when the maximum output power of the power supply unit is equal to or greater than the predetermined value and tinier charging is permitted when the maximum output power is less than the predetermined value. Accordingly, since timer charging is automatically prohibited in fast charging and timer charging is automatically permitted in normal charging, timer charging may not be executed in fast charging. As a result, it is possible to suppress deterioration in convenience for a user.

As illustrated in Steps S125 and S129 in FIG. 5, the ECU 150 executes a process of controlling the charging device such that the power storage device 110 is charged to 100% of the full SOC when the maximum output power of the power supply unit is less than the predetermined value and controlling the charging device such that the power storage device 110 is charged to SOC 80% which is less than the full SOC when the maximum output power is equal to or greater than the predetermined value as the predetermined process.

Accordingly, the power storage device 110 is charged to 100% of the full SOC when the maximum output power of the power supply unit is less than the predetermined value and the power storage device 110 is charged to SOC 80% which is less than the full SOC when the maximum output power is equal to or greater than the predetermined value. Accordingly, a user does not need to set the target SOC depending on fast charging or normal charging. It is possible to prevent the power storage device 110 from being badly affected because the target SOC becomes 100% in fast charging. As a result, it is possible to suppress deterioration in convenience for a user and to contribute to extension of a lifetime of the power storage device 110.

As illustrated in Steps S124A and S128A in FIG. 6, the ECU 150 executes a process of prohibiting pre-air-conditioning, when the maximum output power of the power supply unit is equal to or greater than the predetermined value and permitting pre-air-conditioning when the maximum output power is less than the predetermined value as the predetermined process.

Accordingly, pre-air-conditioning is prohibited when the maximum output power of the power supply unit is equal to or greater than the predetermined value and pre-air-conditioning is permitted when the maximum output power is less than the predetermined value. Accordingly, since pre-air-conditioning is automatically prohibited in fast charging and pre-air-conditioning is automatically permitted in normal charging, pre-air-conditioning can be used in normal charging in which a time longer than that in fast charging is required and a user is away from the vehicle 100 for several hours. As a result, it is possible to improve convenience for a user.

It should be understood that the embodiments disclosed herein are exemplary but are not restrictive in all respects. The scope of the disclosure is not limited to description of the above-mentioned embodiments but is defined by the appended claims, and is intended to include all modifications within meanings and scopes equivalent to the claims.

What is claimed is:

1. A vehicle comprising:
   a power storage device;
   a charging device configured to be supplied with an electric power from a power supply unit external to the vehicle for charging the power storage device; and
   an electronic control unit configured to detect information on a maximum output power of the power supply unit,
   wherein the electronic control unit is configured to execute a predetermined process associated with the charging the power storage device based on the maximum output power of the power supply unit which is indicated by the detected information;
   wherein the electronic control unit is configured to prohibit a timer charging when the maximum output power of the power supply unit is equal to or greater than a predetermined value as the predetermined process, and;
   wherein the electronic control unit is configured to permit the timer charging when the maximum output power of the power supply unit is less than the predetermined value as the predetermined process.

2. The vehicle according to claim 1, further comprising a notification unit,
   wherein the electronic control unit is configured to cause the notification unit to notify that a fast charging for executing the charging the power storage device with a predetermined electric power or more is to be executed when the maximum output power of the power supply unit is equal to or greater than a predetermined value as the predetermined process, and
   wherein the electronic control unit is configured to cause the notification unit to notify that a normal charging for executing the charging the power storage device with the predetermined electric power or less is to be executed when the maximum output power of the power supply unit is less than the predetermined value as the predetermined process.

3. The vehicle according to claim 2, further comprising a charging inlet that is connected to a charging connector,
   wherein the notification unit is configured to display which of the fast charging and the normal charging is to be executed in a vicinity of the charging inlet.

4. The vehicle according to claim 1, wherein the electronic control unit is configured to control the charging device such that the charging device charges the power storage device to a full state of charge when the maximum output power of the power supply unit is less than a predetermined value as the predetermined process, and
   wherein the electronic control unit is configured to control the charging device such that the charging device charges the power storage device to a predetermined state of charge which is less than the full state of charge when the maximum output power of the power supply unit is equal to or greater than the predetermined value as the predetermined process.

5. The vehicle according to claim 1, wherein the electronic control unit is configured to prohibit a pre-air-conditioning when the maximum output power of the power supply unit is equal to or greater than a predetermined value as the predetermined process, and
   wherein the electronic control unit is configured to execute a process of permitting the pre-air-conditioning when the maximum output power of the power supply unit is less than the predetermined value as the predetermined process.

6. A control method for a vehicle, the vehicle including a power storage device, a charging device configured to be supplied with an electric power from a power supply unit external to the vehicle for charging the power storage device, and an electronic control unit configured to detect information on a maximum output power of the power supply unit, the control method comprising:
   executing, by the electronic control unit, a predetermined process associated with charging the power storage device based on the maximum output power of the power supply unit which is indicated by the detected information;
   prohibiting a timer charging when the maximum output power of the power supply unit is equal to or greater than a predetermined value as the predetermined process, and;
   permitting the timer charging when the maximum output power of the power supply unit is less than the predetermined value as the predetermined process.

* * * * *